(12) United States Patent
Anantharaman (10) Patent No.: US 9,953,142 B2
(45) Date of Patent: Apr. 24, 2018

(54) DIGITAL RIGHTS MANAGEMENT AND BEHAVIORAL TRAITS

(71) Applicant: Adobe Systems Incorporated, San Jose, CA (US)

(72) Inventor: Arun Anantharaman, Lost Altos Hills, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/812,825

(22) Filed: Jul. 29, 2015

(65) Prior Publication Data

US 2017/0032109 A1   Feb. 2, 2017

(51) Int. Cl.
*G06F 21/00* (2013.01)
*G06F 21/10* (2013.01)

(52) U.S. Cl.
CPC .................................. *G06F 21/10* (2013.01)

(58) Field of Classification Search
CPC ........ G06F 21/10; G06F 21/105; G06F 21/12; G06F 21/60; G06F 21/62; G06F 21/6209; G06F 21/6218; H04L 2463/101; H04L 2209/603
USPC ............................................................ 726/1
See application file for complete search history.

(56) References Cited

U.S. PATENT DOCUMENTS

| 7,013,149 B2 | 3/2006 | Vetro et al. | |
| 2005/0044016 A1* | 2/2005 | Irwin ..................... | G06F 21/10 705/30 |
| 2005/0066357 A1* | 3/2005 | Ryal .................. | H04N 21/23424 725/35 |
| 2005/0273514 A1* | 12/2005 | Milkey ............. | H04L 29/06027 709/232 |
| 2006/0041502 A1* | 2/2006 | Blair ..................... | G06F 17/227 705/37 |
| 2006/0149727 A1* | 7/2006 | Viitaharju ............... | G06F 21/10 |
| 2008/0060084 A1* | 3/2008 | Gappa ..................... | G09B 5/00 726/28 |
| 2008/0104118 A1 | 5/2008 | Pulfer et al. | |
| 2008/0182592 A1 | 7/2008 | Cha et al. | |

(Continued)

OTHER PUBLICATIONS

"Pre-Interview Communication", U.S. Appl. No. 14/975,442, dated Aug. 4, 2017, 3 pages.

(Continued)

*Primary Examiner* — Yogesh Paliwal
(74) *Attorney, Agent, or Firm* — Wolfe-SBMC (57) ABSTRACT

Digital rights management and behavioral trait techniques are described. In one or more implementations, a method is described of specifying and controlling access to content to be created. Data is received, by one or more computing devices. The data describes characteristics of the content to be created along with a digital rights management policy specifying traits of a behavior to be met by a user in order to access one or more portions of the content. The content is created, based at least in part on the received characteristics, as specified by a user interacting with the one or more computing devices. The digital rights management policy is embedded as part of the created content by the one or more computing devices as a digital rights management module to control access to the one or more portions of the content based on whether the traits are met by a user that requests the access.

20 Claims, 7 Drawing Sheets

(56) References Cited

U.S. PATENT DOCUMENTS

| | | | |
|---|---|---|---|
| 2009/0007227 A1 | 1/2009 | Burgess et al. | |
| 2009/0048908 A1 | 2/2009 | Kaplan et al. | |
| 2011/0235799 A1* | 9/2011 | Sovio | H04L 9/083 380/30 |
| 2012/0216300 A1* | 8/2012 | Vivolo | G06F 21/10 726/30 |
| 2012/0303827 A1 | 11/2012 | Neystadt et al. | |
| 2013/0052990 A1 | 2/2013 | Zhang | |
| 2013/0254699 A1 | 9/2013 | Bashir et al. | |
| 2013/0315392 A1 | 11/2013 | Steinhauser | |
| 2015/0058347 A1 | 2/2015 | Russek | |
| 2015/0234796 A1 | 8/2015 | Williams et al. | |
| 2015/0281299 A1 | 10/2015 | Moustafa et al. | |
| 2015/0324698 A1 | 11/2015 | Karaoguz et al. | |
| 2017/0163839 A1 | 6/2017 | Arana et al. | |
| 2017/0177886 A1 | 6/2017 | Anantharaman | |
| 2017/0262619 A1 | 9/2017 | Taneja et al. | |
| 2017/0277868 A1 | 9/2017 | Anantharaman | |
| 2017/0278205 A1 | 9/2017 | Anantharaman | |
| 2017/0278206 A1 | 9/2017 | Anantharaman | |
| 2017/0286642 A1 | 10/2017 | Anantharaman | |
| 2018/0060598 | 3/2018 | Anantharaman | |

OTHER PUBLICATIONS

Surminen, "Location-based DRM using WiFi Access Points", 2007 International Symposium on Communications and Information Technologies (ISCIT 2007), 2007, 5 pages.

"First Action Interview Pre-Interview Communication", U.S. Appl. No. 15/063,996, dated Oct. 16, 2017, 3 pages.

"Non-Final Office Action", U.S. Appl. No. 15/080,062, dated Nov. 3, 2017, 16 pages.

"Non-Final Office Action", U.S. Appl. No. 15/090,211, dated Nov. 17, 2017, 18 pages.

"Notice of Allowance", U.S. Appl. No. 14/975,442, dated Nov. 2, 2017, 8 pages.

"Corrected Notice of Allowance", U.S. Appl. No. 14/975,442, filed Nov. 29, 2017, 4 pages.

"Corrected Notice of Allowance", U.S. Appl. No. 14/975,442, filed Feb. 27, 2018, 5 pages.

* cited by examiner

DIGITAL RIGHTS MANAGEMENT AND BEHAVIORAL TRAITS

BACKGROUND

Digital rights management is used to control use of content, e.g., to alter, consume, or distribute content. Current digital rights management techniques are based on qualities that are unique to a particular user. For example, a purchaser of an application from a conventional application store, a song from an online music store, and so on may be given access to the content via a user name and password of an account associated with the user for a corresponding service. Other conventional examples include persistent online authentication, unique content identifiers (e.g., CD keys), digital watermarks, and encryption keys associated with a particular user or user's device.

Each of these conventional techniques, however, is rigid and lacks an ability to address changes in how the content is to be consumed and this limit usability of the content. Accordingly, this may be frustrating to consumers of the content and thus limit desired distribution of the content.

SUMMARY

Digital rights management and behavioral trait techniques are described. In one or more implementations, a method is described of specifying and controlling access to content to be created. Data is received, by one or more computing devices. The data describes characteristics of the content to be created along with a digital rights management policy specifying traits of a behavior to be met by a user in order to access one or more portions of the content. The content is created, based at least in part on the received characteristics, as specified by a user interacting with the one or more computing devices. The digital rights management policy is embedded as part of the created content by the one or more computing devices as a digital rights management module to control access to the one or more portions of the content based on whether the traits are met by a user that requests the access.

In one or more implementations, a user credential module is embedded as part of the content, by one or more computing devices, which is configured to permit access to the one or more portions of the content based on user-supplied credentials that are particular to a user. A digital rights management module is embedded as part of the content by the one or more computing devices. The digital rights management policy specifies traits of a behavior that are to be met by the user along with the user-supplied credentials in order to access the one or more portions of the content.

In one or more implementations, a system includes one or more computing devices configured to perform operations. The operations includes obtaining data describing traits of a user responsive to a request received from the user to access content; determining from the data using a digital rights management module embedded as part of the content whether the traits of the user meet specified traits of a behavior of a digital rights management policy enforced by the digital rights management module; and responsive to a determination that the specified traits are met by the user, permitting access to one or more portions of the content, by the embedded digital rights management module, that correspond to the specified traits that are met.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional digital rights management techniques are rigid and inflexible and thus not able to take into account potentially changing traits of a behavior of a user that is to consume content. For example, conventional techniques typically rely on credentials that are particular to a user such that the credentials uniquely identify that user from each other user but do not describe content consumption characteristics of the user. A user name and password, for instance, may be used to control access to content obtained from an online music store, application store, and so on. Accordingly, the user name and password do not in and of themselves describe behaviors of a population, such as a way in which the population acts or conducts itself toward content. As such, although these conventional techniques may relate to the particular user, these techniques do not address traits of a population behavior that may include the user and thus are not capable of addressing changing traits of the behaviors of the users.

Digital rights management techniques are described that address traits of a behavior of a user population that is to consume the content. In one or more implementations, traits of a behavior are specified that are incorporated as part of a digital rights management policy for content. Analytics data, for instance, may be collected that describes a user population as a whole. A creator of a DRM policy may then select traits of behaviors for a target population as a subset of this user population to control content consumption by the subset of the user population. As described above, behaviors describe a way in which a user population acts or conducts itself toward content that is relevant to the population as a whole but is not particular to any specific user of that population.

In this way, access to all or portions of the content may be controlled by a digital rights management module based on contemplated behaviors of consumers of the content, which may be embedded as part of the content. For example, a marketer may wish to include an image as part of a marketing campaign for a population segment. The marketer may then specify traits of behaviors of the specific target population (e.g., content consumption characteristics related to age, gender, geographic location included as part of analytics data) to be implemented as part of a digital rights management policy as well as characteristics of content that is to be created.

The characteristics of the content as specified by the marketer are then used by a creative professional to create the content, which is then embedded with a digital rights management module that is configured to implement the digital rights management policy. Thus, in this example a workflow may be supported in which a target population and corresponding policy is first specified through interaction with analytics data and then used as a basis to create content for deployment.

Once deployed, the digital rights management (DRM) module may implement the digital rights management policy to dynamically address traits and changes to the traits of a behavior of users that consume the content. The DRM module, for instance, is configured to control access to different portions of the content based on which traits are met by a user requesting this access. Further, the access may be conditional, such as to permit access to one portion of content if a trait is met (e.g., age 18-35) but a different portion of content if the trait is not met. In this way, the marketers may specify how content is to be consumed and address potentially changing tastes and desires of users dynamically as the user's traits change without changing the content itself. In this way, a single item of content may dynamically change to address changing behaviors of users that are to consume the content which was not possible in conventional techniques, which thus required updates and changes to the content which would then be populated back to the users.

A variety of other functionality may also be implemented using DRM and behavioral traits. For example, behavioral traits may be used as an additional level of authentication of a user in addition to user supplied credentials such as a password, PIN, and so on. Therefore, a user may login to access content and also have traits of the user checked, e.g., business profile and status, membership in a particular organization, and so forth. Other examples of functionality are described in the following and shown in corresponding figures.

In the following, content refers to a variety of different types of content, such as images, video, sound, and so on. Accordingly, characteristics of content to be created may describe a variety of visual and/or audio characteristics, such as objects to be included in an image, general look and feel of the image, types of sounds to be included in sound, locations for capture of video, and so forth. Digital rights management refers to access control techniques that are usable to control access to the content as a whole or particular portions of the content through use of a digital rights management policy, which in the following may be based on traits of a behavior. Traits of behavior describe a way in which a user population acts or conducts itself toward content that is relevant to the population as a whole but is not particular to any specific user of that population, such as age group, gender, geographic location, profile, business status, group membership, device characteristics. Thus, traits met by a particular user are leveraged by the digital rights management policy to control access to content as a whole or particular portions of the content as further described below.

An example environment is first described that may employ the DRM techniques described herein. Example procedures are then described which may be performed in the example environment as well as other environments. Consequently, performance of the example procedures is not limited to the example environment and the example environment is not limited to performance of the example procedures.

Example Environment

Figure 1:
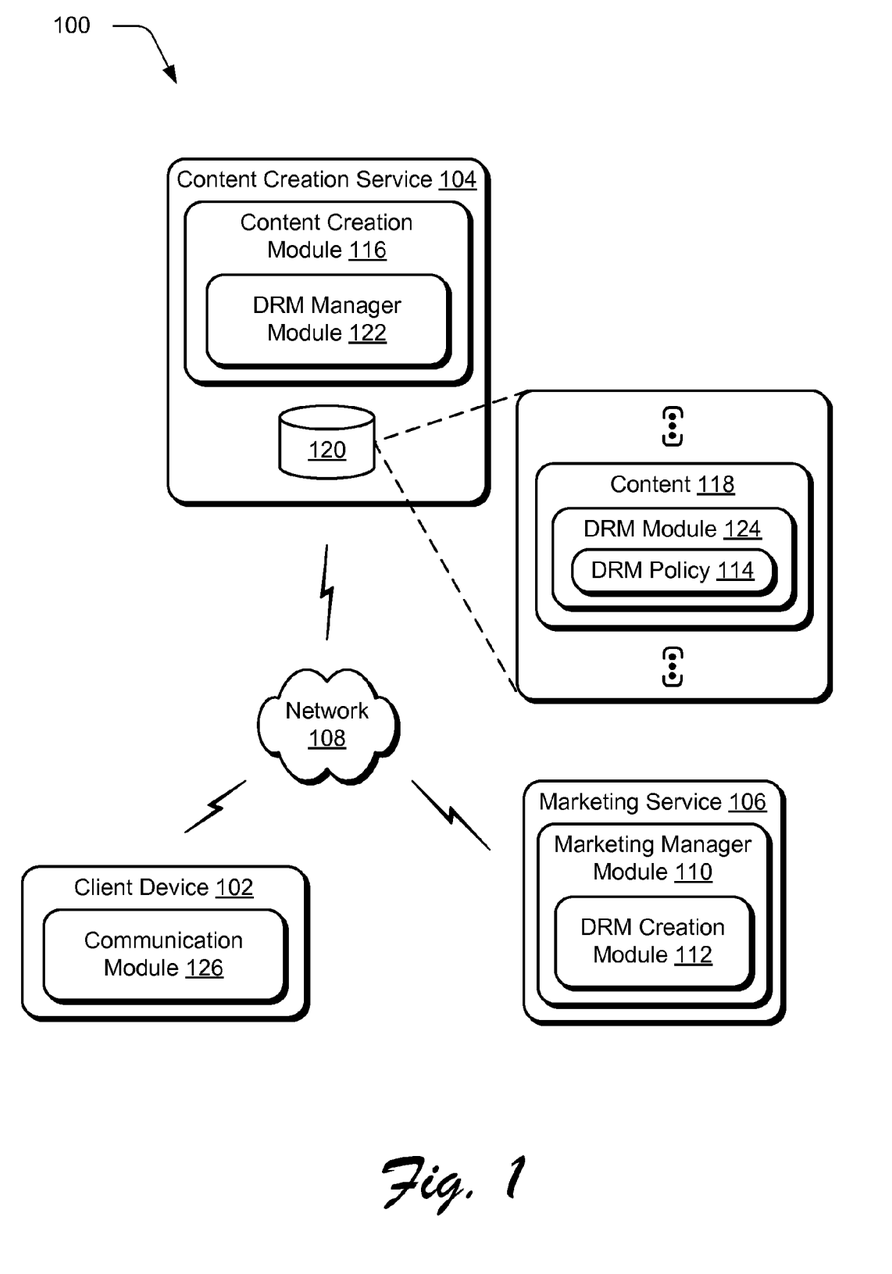
FIG. 1 is an illustration of an environment in an example implementation that is operable to employ digital rights management (DRM) and behavioral trait techniques described herein.

FIG. 1 is an illustration of an environment 100 in an example implementation that is operable to employ digital rights management and behavioral trait techniques described herein. The illustrated environment 100 includes a client device 102, a content creation service 104, and a marketing service 106 that are communicatively coupled, one to another, via a network 108. Each of these entities may be configured in a variety of ways using one or more computing devices.

A computing device, for instance, may be configured as a desktop computer, a laptop computer, a mobile device (e.g., assuming a handheld configuration such as a tablet or mobile phone as illustrated), and so forth to implement the client device 102. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" to implement the content creation service 104 and the marketing service 106 as further described in relation to FIG. 7.

The marketing service 106 is illustrated as including a marketing manager module 110. The marketing manager module 110 is representative of functionality to support user interaction to create a marketing campaign, track deployment of the marketing campaign, and so forth. A user, for instance, may interact with the marketing manager module 110 to specify a marketing campaign, items of content to be included in the campaign, and one or more behaviors of the campaign. The user may also interact with a DRM creation module 112 that is representative of functionality to specify traits of behaviors to form a DRM policy 114 to be utilized to manage access to the content 118. The campaign, for instance, may be configured to control output of different images as a background based on age of users that access the content.

The marketing manager module 110, for instance, may employ analytics to generate analytics data (i.e., "big data") that describes a user population, such as traits of behaviors as described above. Through interaction with the marketing manager module 110, a user may then select traits of behaviors of a target population from this data that are to be met by users to consume corresponding portions of content 118. For example, the marketing manager module 110 may output a user interface via which a user may select traits of behaviors for a desired target population (e.g., age, gender, job title), such as by selecting a check box, keyword input, and so forth. In this way, the user is provided with detailed knowledge of traits of behaviors of a target population and from this knowledge select traits of behaviors to be met to consume particular portions of the content 118, rather than guessing which traits could be met by a target population as performed in conventional techniques which may be prone to error and inefficient.

Data describing the content 118 to be created and the traits specified above as part of creation of the DRM policy 114 through interaction with the DRM creation module 112 is then provided to a content creation service 104 in this example. The content creation service 104 includes a content creation module 116 that is representative of functionality to create content 118, which is illustrated as stored in storage 120. A variety of content may be created, such as webpages, printed documents, advertisements, media including video and/or audio content, and so forth.

Continuing with the previous example, a user interacts with the content creation module 116 to create content 118 having characteristics as specified by the marketing service 106. As part of this creation, a DRM manager module 122 is used to embed a DRM module 124 as part of the content 118. The DRM manager module 122 is representative of functionality to control implementation of the DRM policy 114 as part of the content 118 during consumption of the content 118, e.g., by a communication module 126 (e.g., browser, web-enabled application) of the client device 102.

The DRM module 124, for instance, may be configured to determine traits of a user that requests access to the content 118 and provide access to portions of the content 118, if any, that correspond to those traits. For example, the DRM policy 114 may specify different backgrounds of an advertisement for different behaviors. Accordingly, the DRM module 124 determines traits of a user requesting access and provides access to corresponding portions of the content 118, e.g., the backgrounds. In this way, the DRM policy 114 as specified by the marketing service 106 in this example serves as a basis for creation of the content 118 and management of access to portions of the content 118. Examples that support additional complications and dynamic responses of DRM control are described in the following.

Figure 2:
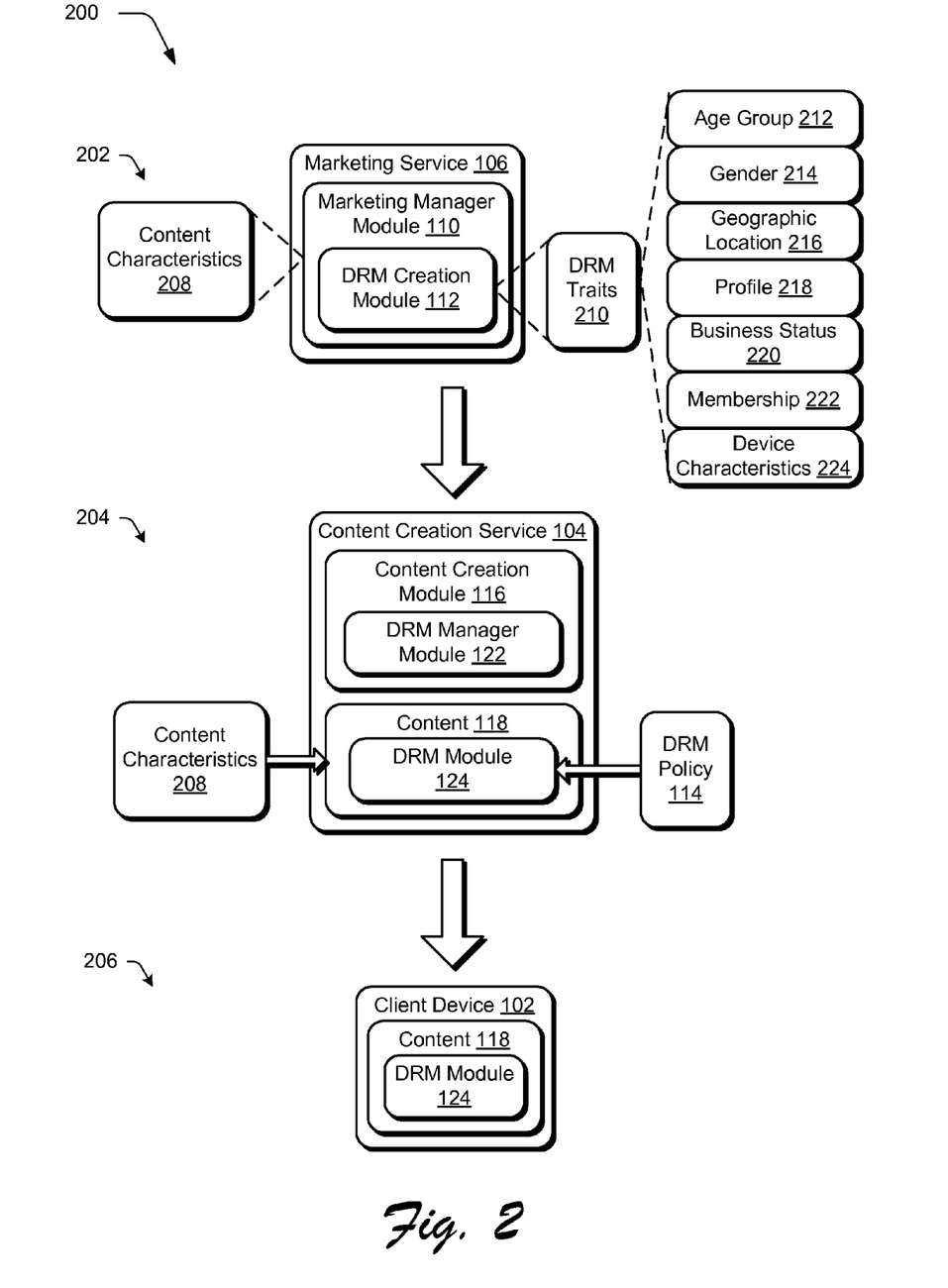
FIG. 2 depicts a system in an example implementation of creation of a DRM policy and subsequent content to be consumed by users included in a behavior.

FIG. 2 depicts a system 200 in an example implementation of creation of a DRM policy and subsequent content to be consumed by users included in a target segment. The system 200 is illustrated using first, second, and third stages 202, 204, 206. At the first stage 202, user interaction with a marketing manager module 110 is used to specify content characteristics 208, e.g., as for part of a marketing campaign. A variety of different content characteristics 208 may be specified, including type of content such as webpage, printed add, audio such as a jingle or song, video such as an instructional product video or dedicated product advertisement, legal contract. The content is also deliverable in a variety of ways, e.g., streaming or downloaded for local storage and subsequent playback.

The marketing manager module 110 as previously described also includes a DRM creation module 112. The DRM creation module 112 in this instance is representative of functionality to specify digital rights management (DRM) traits 210 of behaviors that are used to create a DRM policy 114 of the content creation service 104. The DRM policy 114 as previously described is configured to control content access by determining which traits of users are satisfied in order to gain access to portions of content. As described above, the DRM traits may be specified in a variety of ways, such as through selection of particular traits collected through analytics by the marketing service 106.

A variety of different DRM traits 210 may be specified, such as traits particular to a behavior but are not unique to individual members having the behavior, e.g., may be satisfied by a plurality of users. Examples of such behavioral traits that are usable to determine potential interaction of a user with content include age group 212 (e.g., particular age or age range), gender 214, geographic location 216 (e.g., based on IP address, city, state, region, country, continent), profile 218 (e.g., traits included in a social network profile, business title in a business website, educational degrees achieved, particular skills), business status 220 (e.g., whether an associated business is in good standing, business certifications), group membership 222 (e.g., membership to a particular organization), device characteristics 224 of a device being used by the user to gain access (e.g., brand, hardware resources, software resources, display resources), and so forth. Examples in which traits that are user specific are also contemplated as further described in relation to FIG. 4.

At the second stage 204, a content creation module 116 of the content creation service 104 is used to create content 118 and a DRM module 124 to control access to the content 118 as specified by a DRM policy 114 created based on the specified DRM traits 210. A creative professional, for instance, may interact with the content creation module 116 of the content creation service 104 to create content 118 as specified by the content characteristics 208 received from the marketing service 106. The marketing service 106, for instance, may specify different images and the content characteristics 208 thereof to be used as alternatives as part of a marketing campaign based on the DRM traits 210. The creative professional may then create content 118 as specified.

The content creation module 116 also includes a DRM manger module 122 that is representative of functionality that is configured to implement the DRM policy 114 through embedding the DRM module 124 as part of the content 118. The DRM module 124, for instance, may be executable to determine DRM traits associated with consumption of the content 118. As described above, these may include DRM traits 210 of a behavior that are not specific to a particular user, including traits of a device used, age group, geographic location, and so forth.

Accordingly, the content 118 having the DRM module 124 may be provided to a client device 102 for consumption as shown at the third stage 206. The DRM module 124 may then be utilized to address differences in traits between users, such as gender 212. The DRM module 124 is also usable to address changes in the user, itself, such as change in age group 212, geographic location 216, business status 220 (e.g., job title), membership 222, and so on as described above. Further, as the DRM module 124 is embedded as part of the content 118 this dynamic consumption may be performed offline without accessing a network, and thus may address limitations of conventional techniques that required access in order to serve different content, such as targeted advertisements as part of webpages that are obtained and not available locally until relevant characteristics of a user are determined, e.g., geographic location.

Figure 3:
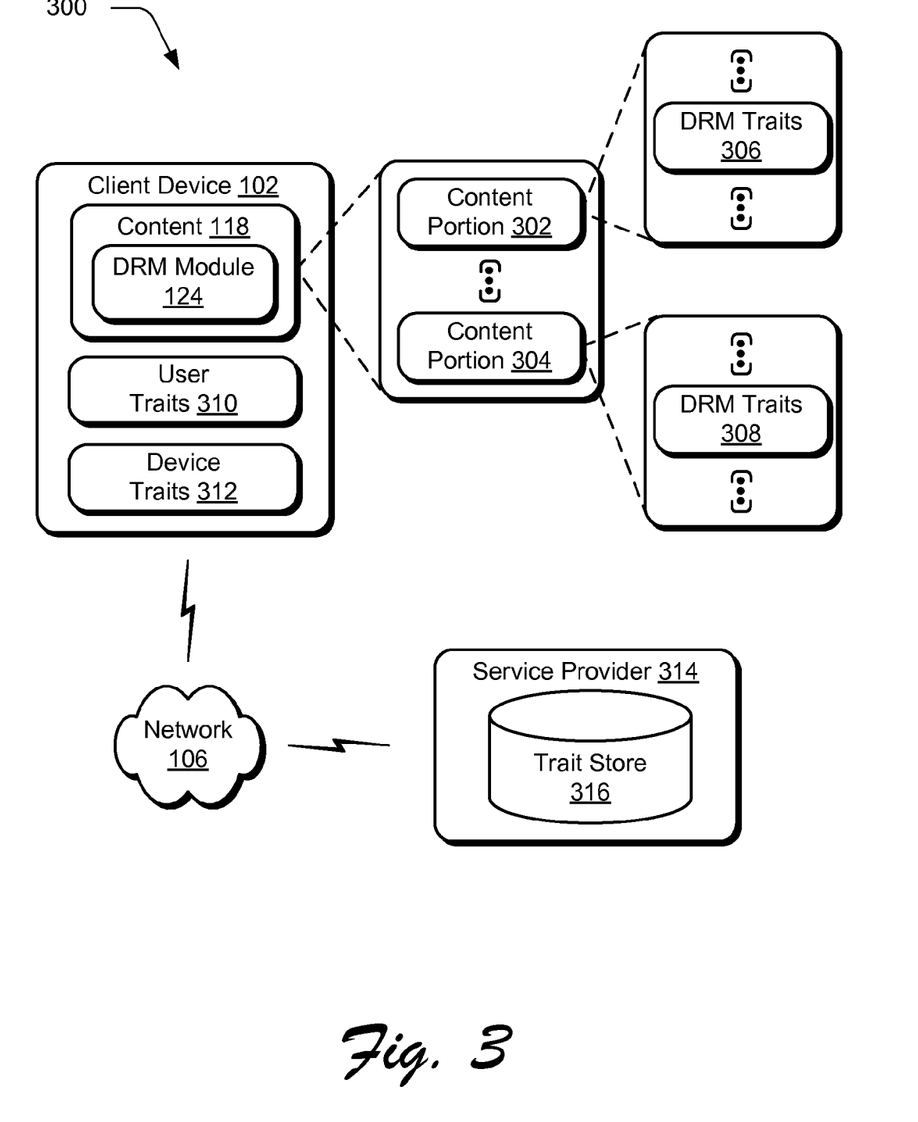
FIG. 3 depicts a system in an example implementations in which a DRM module is configured to output alternate content portions responsive to a determination regarding which DRM traits are satisfied by a consumer of the content.

FIG. 3 depicts a system 300 in an example implementations in which the DRM module 124 is configured to output alternate content portions responsive to a determination regarding which DRM traits are satisfied by a consumer of the content. As illustrated, the content 118 includes a DRM module 124 as described in relation to FIG. 2. The DRM module 124 in this example is configured to control output of different content portions 302, 304 that are each associated with different DRM traits 306, 308, respectively, that are specified as part of DRM traits 210 as described above.

As before, this may be based on a determination by the DRM module 124 as to which of the DRM traits 306, 308, if any, are met by user traits 310, device traits 312, and so on. The content portions 302, 304, for instance, may be configured as alternate background images included in a marketing campaign of the content 118. Accordingly, DRM traits 306 satisfied for output of content portion 320 differ from DRM traits 308 satisfied for output of content portion 304 and thus in this example output of the content portions 302, 304 is mutually exclusive, although other examples are also contemplated.

As mentioned before, other DRM traits may also be leveraged as a basis by the DRM module 124 to control access to the content portions 302, 304. For example, the DRM module 124 may access a service provider 314 via a network 106 that is configured to store traits 316. These traits may include a job title of a user, membership in particular club, status in a social networking site, and so on. In this way, the service provider 314 may provide an additional source of traits that are usable by the DRM module 124 to control access to content portions 302, 304.

Figure 4:
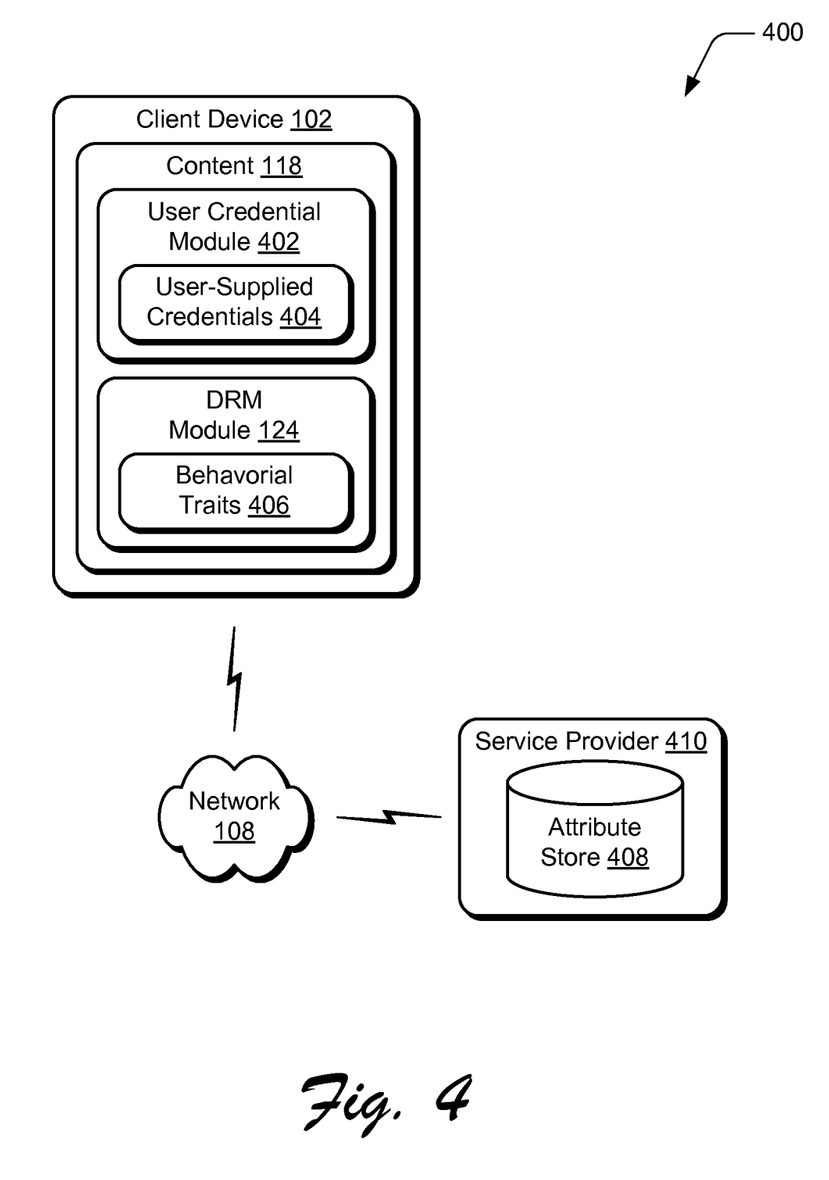
FIG. 4 depicts a system in an example implementation in which digital rights management based on behavioral traits is used to supplement digital rights management that relies on user-specific credentials.

FIG. 4 depicts a system 400 in an example implementation in which digital rights management based on behavioral traits is used to supplement digital rights management that relies on user-specific credentials. In this example, the behavioral traits are used as a "second check" to verify whether access to portions of the content 118 is to be permitted.

As illustrated, the content 118 includes a user credential module 402 that is usable to control access to the content based on user-supplied credentials 404. A user, for instance, may be prompted to enter a user name and password, unique code, badge number, product number, a unique identifier for client device 102, and so forth. In this way, user access is controlled by the user credential module 402 using credentials that are unique to the user.

The content 118 also includes a DRM module 124 that leverages behavioral traits 406 associated with a behavior to control access, which may be obtained locally or from an attribute store 408 of a service provider 410 via the network 108 as previously described. Examples of such traits as described in relation to FIG. 2 include age group 212 (e.g., particular age or age range), gender 214, geographic location 216 (e.g., based on IP address, city, state, region, country, continent), profile 218 (e.g., traits included in a social network profile, business title in a business website, educational degrees achieved, particular skills), business state 220 (e.g., whether an associated business is in good standing, business certifications), group membership 222 (e.g., membership to a particular organization), device characteristics 224 of a device being used by the user to gain access (e.g., brand, hardware resources, software resources, display resources), and so forth.

In this way, the behavioral traits 406 may also be used to verify access to portions of the content along with the user-supplied credentials to work as a second check. This is usable to serve desired content to users as well as further protect the content from unauthorized parties through employing additional behavioral traits that may be difficult for the unauthorized parties to determine. For example, the content 118 may be protected by a user name and password and well as DRM traits of a behavior of the user. A variety of other examples are also contemplated.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
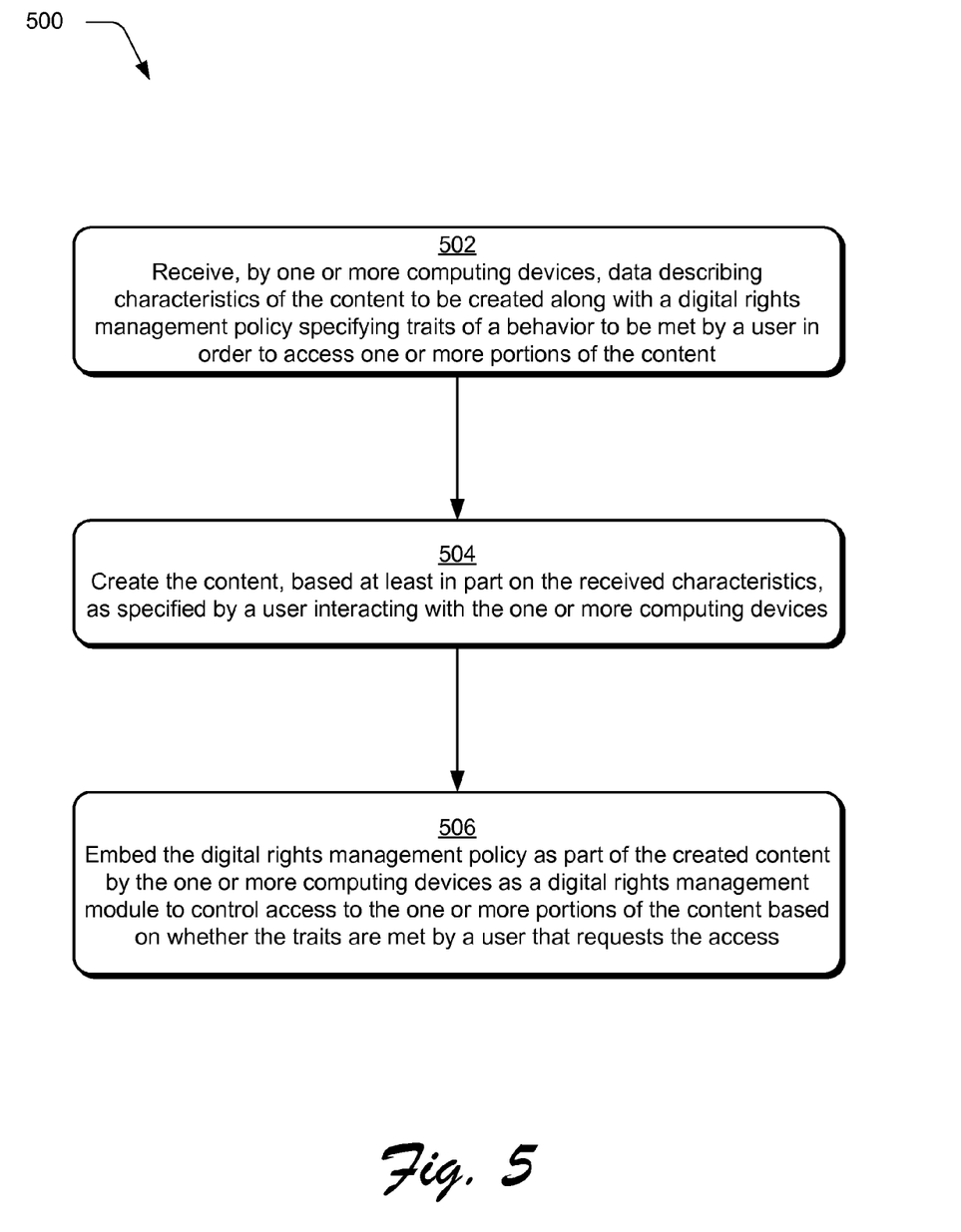
FIG. 5 is a flow diagram depicting a procedure in an example implementation in which content is created based on characteristics created along with a digital rights management policy for consumption of the content.

FIG. 5 depicts a procedure 500 in an example implementation in which content is created based on characteristics created along with a digital rights management policy for consumption of the content. Data is received, by one or more computing devices. The data describes characteristics of the content to be created along with a digital rights management policy specifying traits of a behavior to be met by a user in order to access one or more portions of the content (block 502). A marketing professional interacting with a marketing service 106, for instance, may specify content characteristics 208 and a DRM policy of a behavioral that is to access the content, such as to create a set of images for consumption by children and a set of images for consumption by adults, such as different splash screens for a DVD for an animated movie.

The content is created, based at least in part on the received characteristics, as specified by a user interacting with the one or more computing devices (block 504). The digital rights management policy is embedded as part of the created content by the one or more computing devices as a digital rights management module to control access to the one or more portions of the content based on whether the traits are met by a user that requests the access (block 506). Continuing with the previous example, a user interacting with the content creation service 104 is then guided by the content characteristics 208 to create corresponding content and a DRM module 124 is embedded to enforce the DRM policy 114. In this way, a process is provided in which DRM policy is specified before content creation, which is the opposite in conventional techniques. Further, creation of the content may be guided by the content characteristics 208 specified as well as the DRM policy through specification of DRM traits of the behavior of a user population that is to consume the content.

Figure 6:
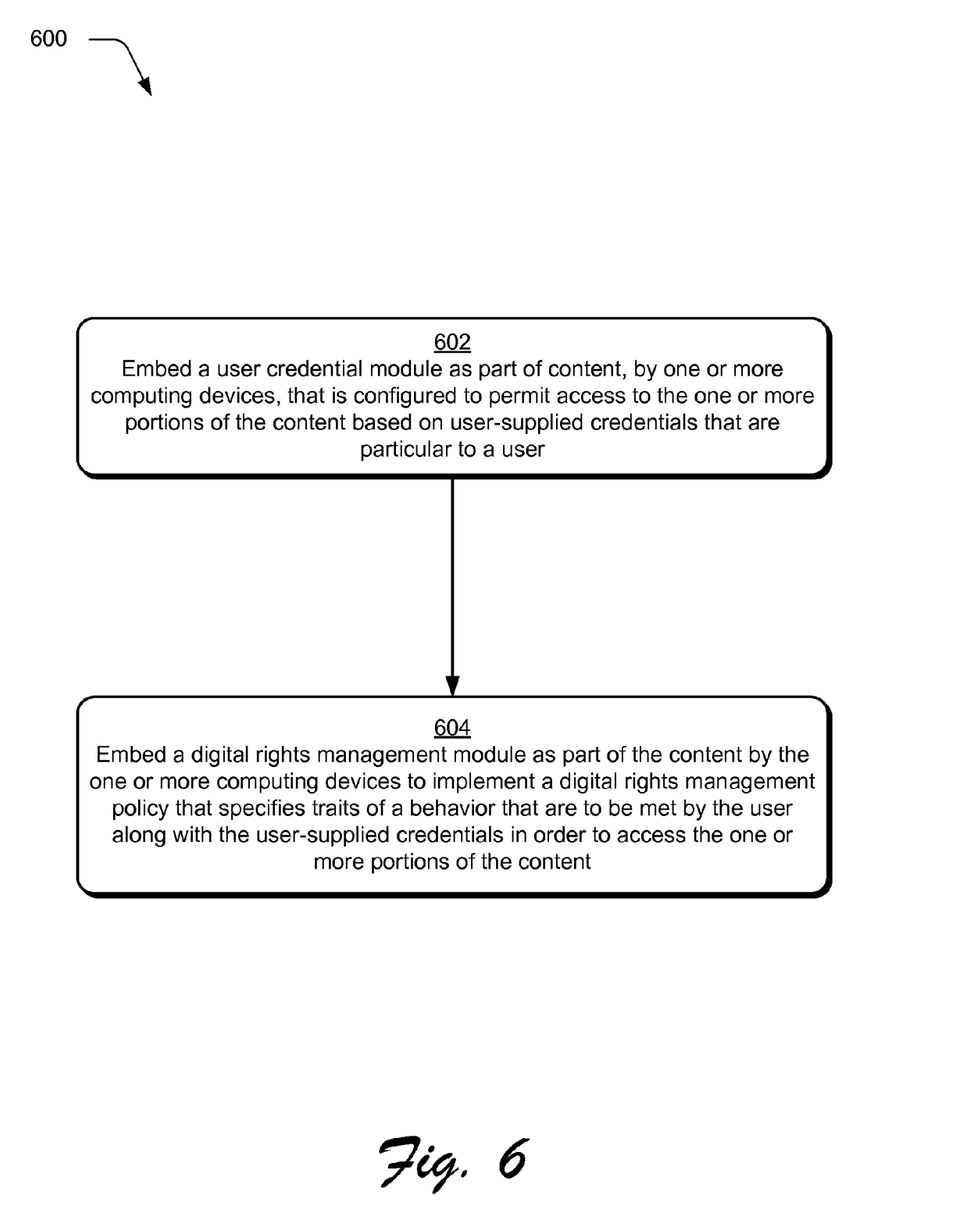
FIG. 6 is a flow diagram depicting a procedure in an example implementation in which a user credential module and digital rights management module are embedded in content.

FIG. 6 depicts a procedure 600 in an example implementation in which a user credential module and digital rights management module are embedded in content. A user credential module is embedded as part of the content, by one or more computing devices, which is configured to permit access to the one or more portions of the content based on user-supplied credentials that are particular to a user (block 602). As shown in FIG. 4, for instance, the content 118 is embedded with a user credential module 402 that is configured to control access to portions of the content 118 based on user-supplied credentials, such as user alias, password, unique code, and so forth. In this way, the user-supplied credentials 404 are unique to the user requests access to the content 118.

A digital rights management module is embedded as part of the content by the one or more computing devices. The digital rights management policy specifies traits of a behavior that are to be met by the user along with the user-supplied credentials in order to access the one or more portions of the content (block 604). Continuing with the previous example, the traits correspond to a behavior of a user population, of which, a user that is to gain access is a member. Thus, the traits are not unique to the user, but generalized for the behavior. In this way, characteristics that are unique to the user and that are not unique to the user but rather correspond to a behavior but are still usable to different the user from other users that are not members of that population. A variety of other examples are also contemplated without departing from the spirit and scope thereof.

Example System and Device

Figure 7:
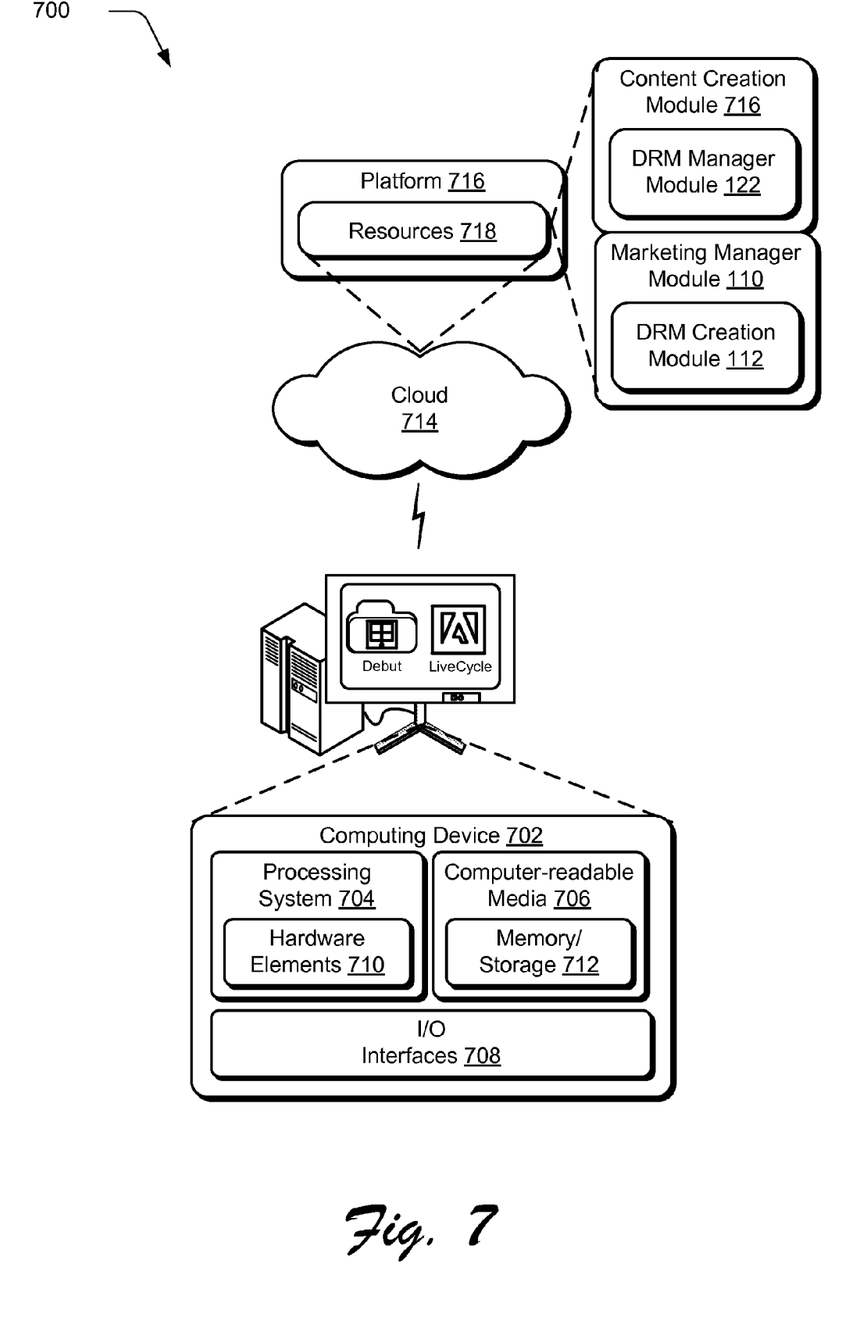
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the content creation module 116, DRM manager module 122, marketing manager module 110, and DRM creation module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of creating content in a digital medium environment, the method comprising:
    receiving, by at least one computing device, data describing characteristics of the content to be created along with a digital rights management policy specifying traits of a behavior to be met by a user in order to access one or more portions of the content;
    receiving, by the at least one computing device and subsequent to receiving the data, at least one user input to create the content as having the characteristics described by the received data;
    creating, by the at least one computing device, the content based on the received at least one user input; and
    embedding, by the at least one computing device, the digital rights management policy formed based on the traits of the behavior as part of the created content as a digital rights management module to control access to the one or more portions of the content based on whether the traits are met by a user that requests the access, the digital rights management module not being particular to the user that requests the access.

2. A method as described in claim 1, wherein the specified traits of the behavior are not unique to the user but rather are usable to define the behavior of a user population as a whole such that a plurality of said users are likely to meet the characteristics.

3. A method as described in claim 1, wherein the digital rights management module is embedded as part of the created content such that the one or more portions are available offline to the digital rights management module locally and without network access.

4. A method as described in claim 1, wherein the digital rights management module is configured to control access such that access to a first said portion of the content is made available when a first set of said traits are met and access to a second said portion of the content is made available when a second set of said traits are met.

5. A method as described in claim 4, wherein the first and second set of said traits are mutually exclusive such that the user that meets the first set of said traits cannot met the second set of said traits.

6. A method as described in claim 1, wherein the traits of the behavior include age, gender, geographic location.

7. A method as described in claim 1, wherein the traits of the behavior include membership in a particular organization, business status, or job title.

8. A method as described in claim 1, wherein the traits of the behavior involve characteristics of a device used to access the content.

9. A system for creating content in a digital medium environment, the system comprising:
    one or more processors; and
    one or more computer-readable storage media storing computer-executable instructions that, responsive to execution by the one or more processors, cause the system to perform operations including:
        receiving data describing characteristics of the content to be created along with a digital rights management policy specifying traits of a behavior to be met by a user in order to access one or more portions of the content;

receiving, subsequent to receiving the data, at least one user input to create the content as having the characteristics described by the received data;

creating the content based on the received at least one user input; and embedding the digital rights management policy formed based on the traits of the behavior as part of the created content as a digital rights management module to control access to the one or more portions of the content based on whether the traits are met by a user that requests the access, the digital rights management module not being particular to the user that requests the access.

10. A system as described in claim 9, wherein the specified traits of the behavior are not unique to the user but rather are usable to define the behavior of a user population as a whole such that a plurality of said users are likely to meet the characteristics.

11. A system as described in claim 9, wherein the digital rights management module is embedded as part of the created content such that the one or more portions are available offline to the digital rights management module locally and without network access.

12. A system as described in claim 9, wherein the digital rights management module is configured to control access such that access to a first said portion of the content is made available when a first set of said traits are met and access to a second said portion of the content is made available when a second set of said traits are met.

13. A system as described in claim 12, wherein the first and second set of said traits are mutually exclusive such that the user that meets the first set of said traits cannot met the second set of said traits.

14. A system as described in claim 9, wherein the traits of the behavior include age, gender, geographic location.

15. A system as described in claim 9, wherein the traits of the behavior include membership in a particular organization, business status, or job title.

16. A system as described in claim 9, wherein the traits of the behavior involve characteristics of a device used to access the content.

17. One or more computer-readable storage media comprising instructions stored thereon that, responsive to execution by one or more processors of a computing device, cause the computing device to perform operations comprising:

receiving data describing characteristics of the content to be created along with a digital rights management policy specifying traits of a behavior to be met by a user in order to access one or more portions of the content;

receiving, subsequent to receiving the data, at least one user input to create the content as having the characteristics described by the received data;

creating the content based on the received at least one user input; and embedding the digital rights management policy formed based on the traits of the behavior as part of the created content as a digital rights management module to control access to the one or more portions of the content based on whether the traits are met by a user that requests the access, the digital rights management module not being particular to the user that requests the access.

18. One or more computer-readable storage media as described in claim 17, wherein the specified traits of the behavior are not unique to the user but rather are usable to define the behavior of a user population as a whole such that a plurality of said users are likely to meet the characteristics.

19. One or more computer-readable storage media as described in claim 17, wherein the digital rights management module is embedded as part of the created content such that the one or more portions are available offline to the digital rights management module locally and without network access.

20. One or more computer-readable storage media as described in claim 17, wherein the digital rights management module is configured to control access such that access to a first said portion of the content is made available when a first set of said traits are met and access to a second said portion of the content is made available when a second set of said traits are met.

* * * * *